(12) United States Patent
Guo et al.

(10) Patent No.: US 10,554,938 B2
(45) Date of Patent: Feb. 4, 2020

(54) LIGHT SOURCE SYSTEM, AND PROJECTION SYSTEM AND METHOD

(71) Applicant: APPOTRONICS CHINA CORPORATION, Shenzhen (CN)

(72) Inventors: Zuqiang Guo, Shenzhen (CN); Zeqin Wang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/306,227

(22) PCT Filed: Apr. 23, 2015

(86) PCT No.: PCT/CN2015/077247
§ 371 (c)(1),
(2) Date: Oct. 24, 2016

(87) PCT Pub. No.: WO2015/161810
PCT Pub. Date: Oct. 29, 2015

(65) Prior Publication Data
US 2017/0048502 A1 Feb. 16, 2017

(30) Foreign Application Priority Data
Apr. 23, 2014 (CN) .......................... 2014 1 0166761

(51) Int. Cl.
*G03B 21/20* (2006.01)
*H04N 9/31* (2006.01)
(Continued)

(52) U.S. Cl.
CPC ............. *H04N 9/3114* (2013.01); *F21V 9/40* (2018.02); *G02B 26/008* (2013.01); *G02B 26/0833* (2013.01); *G03B 21/204* (2013.01)

(58) Field of Classification Search
CPC .......... F21V 13/00; F21V 9/10; G02B 26/00; G02B 26/08; G03B 21/14; G03B 21/20; H04N 9/31
See application file for complete search history.

(56) References Cited

U.S. PATENT DOCUMENTS

| 5,612,753 A | 3/1997 | Poradish et al. |
| 5,863,125 A | 1/1999 | Doany |

(Continued)

FOREIGN PATENT DOCUMENTS

| CN | 101231451 A | 7/2008 |
| CN | 101929637 A | 12/2010 |

(Continued)

OTHER PUBLICATIONS

International Search Report in the parent PCT application No. PCT/CN2015/077247, dated Jul. 3, 2015.

(Continued)

*Primary Examiner* — Cara E Rakowski
*Assistant Examiner* — Danell L Owens
(74) *Attorney, Agent, or Firm* — Chen Yoshimura LLP

(57) ABSTRACT

A light source system including: a light source device emitting excitation light; an light output device receiving the excitation light and converting it into converted light, wherein the light output device includes at least two different wavelength conversion materials, the converted light of at least one wavelength conversion material being a multi-color light; a light splitting and combining device splitting the multi-color light into a first and a second color light propagating respectively along a first and a second optical channel, wherein the first and second color lights have different wave spectrum coverage ranges; and a first and a second light modulation device respectively modulating the light propagating over the first and second optical channels, (Continued)

wherein the light of three primary colours can be allocated to two DMDs for processing. This results in improved colour gamut of the light source and the light efficiency and reliability of the system.

4 Claims, 15 Drawing Sheets

(51) Int. Cl.
*F21V 9/40* (2018.01)
*G02B 26/00* (2006.01)
*G02B 26/08* (2006.01)

(56) References Cited

U.S. PATENT DOCUMENTS

| | | | |
|---|---|---|---|
| 2005/0078055 A1* | 4/2005 | Willson | G02B 26/0833 345/32 |
| 2005/0259225 A1 | 11/2005 | Greenberg et al. | |
| 2006/0087847 A1 | 4/2006 | Yamanaka | |
| 2007/0211223 A1 | 9/2007 | Pettitt et al. | |
| 2009/0034284 A1* | 2/2009 | Li | G03B 21/204 362/554 |
| 2010/0238412 A1 | 9/2010 | Kurosaki | |
| 2012/0026472 A1* | 2/2012 | Masuda | G03B 21/204 353/85 |
| 2012/0033185 A1* | 2/2012 | Chang | G02B 26/008 353/33 |
| 2013/0077055 A1* | 3/2013 | Wang | H04N 9/3105 353/31 |
| 2013/0077056 A1* | 3/2013 | Okuda | H04N 9/3105 353/31 |
| 2013/0229634 A1* | 9/2013 | Hu | G03B 21/204 353/84 |
| 2014/0176914 A1* | 6/2014 | Mueller | F21S 10/007 353/31 |
| 2014/0347634 A1* | 11/2014 | Bommerbach | H04N 9/3158 353/31 |
| 2015/0049456 A1* | 2/2015 | Hoehmann | H04N 9/3158 362/84 |
| 2015/0253654 A1 | 9/2015 | Hu et al. | |
| 2017/0255087 A1 | 9/2017 | Hu et al. | |
| 2017/0255088 A1 | 9/2017 | Hu et al. | |
| 2017/0255089 A1 | 9/2017 | Hu et al. | |
| 2017/0255090 A1 | 9/2017 | Hu et al. | |
| 2017/0255091 A1 | 9/2017 | Hu et al. | |
| 2017/0255092 A1 | 9/2017 | Hu et al. | |

FOREIGN PATENT DOCUMENTS

| | | |
|---|---|---|
| CN | 102645827 A | 8/2012 |
| CN | 103019017 A | 4/2013 |
| CN | 103713455 A | 4/2014 |
| JP | 2006-119440 A | 5/2006 |
| JP | 2010-217566 A | 9/2010 |
| JP | 4707646 B2 | 6/2011 |
| JP | 2012-63564 A | 3/2012 |
| TW | 201040651 A | 11/2010 |
| WO | 2014/048287 A1 | 4/2014 |

OTHER PUBLICATIONS

IPRP in the parent PCT application No. PCT/CN20151077247, dated Oct. 25, 2016.
Chinese Office Action, dated Jul. 31, 2017, and Search Report dated Jul. 23, 2017, in a counterpart Chinese patent application, No. CN 201410166761.4.
Chinese Office Action, dated Jan. 22, 2018 in a counterpart Chinese patent application, No. CN 201410166761.4.
Extended European Search Report, dated Mar. 10, 2017, in a counterpart EP application, No. EP 15782632.2.
Communication pursuant to Article 94(3) EPC, dated Sep. 17, 2018 in corresponding application EP 15782632.2.
Japanese Office Action, dated Aug. 22, 2017 in a counterpart Japanese patent application, No. JP 2016-563806.
Japanese Office Action, dated Mar. 6, 2018 in a counterpart Japanese patent application, No. JP 2016-563806.
Taiwanese Office Action, dated Apr. 11, 2016 in a counterpart Taiwanese patent application, No. TW 104112082.

* cited by examiner

LIGHT SOURCE SYSTEM, AND PROJECTION SYSTEM AND METHOD

BACKGROUND OF THE INVENTION

Field of the Invention

This invention relates to optical apparatus, and in particular, it relates to a light source system, projection system and related methods.

Description of Related Art

Digital light processing (DLP) projection technology is gaining wide use, a core piece of which is digital micromirror device (DMD).

FIG. 1a illustrates a conventional single chip DMD projection system. As shown in FIG. 1, the system includes: excitation light source 100, collection lens 101, rotating color wheel 102, light rod 103, optical relay system 104, DMD chip 105, TIR (total internal reflection) prism 106, and projection lens 107. The excitation light source 100 is a semiconductor laser, and its emitted light is focused by the collection lens 101 onto the rotating color wheel 102. The rotating color wheel 102 is coated with wavelength conversion materials (e.g. phosphors) on different color segments. FIG. 1b is a plan view of the rotating color wheel with different color segments. As shown in FIG. 2, a time sequence of three primary color lights red, green and blue is generated by the rotating color wheel 102. The light is homogenized by the light rod 103, and incident on the TIR prism 106 via the optical relay system 104; the light is reflected to the DMD chip 105 and modulated by it, and finally forms an output image by the projection lens 107.

In conventional DMD projection system, the three primary color lights red, green and blue are inputted to the DMD sequentially in time, to be modulated; the monochromatic images are combined into a color image by the effect of persistence of vision of the human eyes. This system uses laser as the excitation light sources, which has the advantages of low etendue and high light efficiency. Conventional technology uses semiconductor laser devices to excite the different color segments of the color wheel to generate the red, green and blue primary lights. However, in this technology which uses semiconductor laser devices to excite phosphor materials in the color wheel, red phosphors have low conversion efficiency, leading to shortcomings in output image brightness and color gamut. This lowers the light efficiency and reliability of the system.

SUMMARY

Accordingly, the present invention is directed to a light source system, projection system and related methods which can improve the efficiency of red light generation, thereby improving the light efficiency and color saturation of the system.

To achieve these and/or other objects, the present invention provides a light source system, which includes:

a light source device, including least one group of excitation light sources generating an excitation light;

a light output device, which receives the excitation light and converts the excitation light to generate a converted light for output, wherein the light output device includes at least two different wavelength conversion materials, and wherein at least one of the wavelength conversion materials generates a converted light that is a multi-color light;

a light separation and combination device, which separates the multi-color light into a first light of a first wavelength range travelling along a first light path and a second light of a second wavelength range travelling along a second light path, wherein the first wavelength range and the second wavelength range are different, and wherein a combined light of all converted lights is a white light;

a first light modulation device, which modulates light that travels along the first light path; and a second light modulation device, which modulates light that travels along the second light path.

Preferably, the converted light further includes a primary color light, wherein the light separation and combination device directs the primary color light to travel along the first light path of the second light path.

Preferably, the light output device is a color wheel, wherein the at least two different wavelength conversion materials are located on different segments of the color wheel.

Preferably, wherein the at least two different wavelength conversion materials absorb the excitation light from the light source device and emit at least two different multi-color lights. Preferably, the at least two different wavelength conversion materials are a cyan phosphor and a yellow phosphor, or a magenta phosphor and a cyan phosphor, or a magenta phosphor and a yellow phosphor.

Preferably, the light output device further comprises a multi-segment filter wheel which rotates coaxially with the color wheel, wherein the multi-segment filter wheel includes at least two different colored filter segments.

Preferably, the multi-segment filter wheel has a blue, a yellow and a green filter region, or a blue, a yellow and a red filter region, or a blue, a first yellow and a second yellow filter region.

Preferably, the light source device includes two groups of excitation sources.

Preferably, the light output device includes two color wheels respectively corresponding to the two groups of excitation light sources, wherein each color wheel has at least one wavelength conversion material, and wherein the wavelength conversion material of the two color wheels are non-identical.

Preferably, one of the two color wheels includes a blue or a cyan phosphor, and the other one includes a yellow phosphor and/or a green phosphor. Preferably, the light output device further includes: at least one multi-segment filter wheel which rotates coaxially with the color wheel, wherein the multi-segment filter wheel includes at least one different colored filter segments.

Preferably, the multi-segment filter wheel includes a yellow filter region and a green filter region.

Preferably, the two groups of excitation light sources are turned on and off alternatingly.

Preferably, the turn on time periods of one of the two groups of excitation light sources overlap with turn on time periods of the other one of the two groups of excitation light sources.

Preferably, two groups of excitation light sources are modulated by pulse width modulation.

Preferably, the light source system further includes a first filter plate and/or a second filter plate, where the first filter plate is disposed on a light path between the light separation and combination device and the first light modulation device, for filtering light travelling along the first light path, and wherein the second filter plate is disposed on a light path between the light separation and combination device and the second light modulation device, for filtering light travelling along the second light path.

In another aspect, the present invention provides a projection system, which includes: any of the above the light source system, and a projection lens, wherein the projection lens receives from the light source system the combined light after modulation, to form a projected image.

In another aspect, the present invention provides a projection method, which includes:

Providing at least one group of excitation light sources that emits an excitation light.

Receiving the excitation light, converting it to a converted light and outputting it, wherein the light output device includes at least two different wavelength conversion material, and wherein at least one of the wavelength conversion materials generates a converted light that is a multi-color light.

Separating the multi-color light into a first light of a first wavelength range travelling along a first light path and a second light of a second wavelength range travelling along a second light path, wherein the first wavelength range and the second wavelength range are different, and wherein the combined light of the converted lights is a white light.

Modulating light travelling along the first light path, and modulating light travelling along the second light path.

Conventional technologies use single DMD chip to simultaneously process the three primary color lights, or three DMD chips where each DMD processes a single primary color light. This way, the red, green and blue primary lights are input to the DMD in a time sequence to be modulated. The limitations of efficiency of red phosphors lower the output image brightness and reduces color gamut. In embodiments of the present invention, by exciting relatively high efficiency phosphors, a combined light containing two primary colors is generated, such as yellow light containing red light and green light; and then, using light separation method to distribute the two primary color lights to two DMDs for processing, the three primary color lights are distributed to two DMDs for processing. This way, the ratio of the three primary color lights can be adjusted, and the system can output multiple color lights including primary colors and intermediate colors. Thus, the color gamut of the light source is greatly increased, the light efficiency of the system is improved, the color gamut of the system is increased, and the cost is reduced.

BRIEF DESCRIPTION OF THE DRAWINGS

FIG. 18 is a timing diagram of the reflected light from the first and second DMDs when the light source devices are alternatingly turned on.

FIG. 20 is a timing diagram of the reflected light from the first and second DMDs when the light source devices are alternatingly turned on.

DETAILED DESCRIPTION OF PREFERRED EMBODIMENTS

Embodiments of the present invention are described in detail below with reference to the drawings.

In conventional technologies, where a single DMD chip is used to simultaneously process the three primary color lights, or where three DMD chip are used where each DMD processes one of the three primary color lights, the red, green and blue lights are sequentially inputted to the DMDs for modulation. Limitations of the efficiency of the red phosphors decrease the output image brightness and reduce the color gamut.

Embodiments of the present invention use laser light to excite a phosphor having relatively high efficiency, to generate a converted light that contains two primary colors, such as a yellow light that contains red and green lights. Using a light separation method, the two primary color lights are separately inputted to two DMDs for processing. By distributing the three primary color lights according to desired ways to two DMDs for processing, the ratios of the three primary lights can be adjusted, which can achieve output of multiple colors including the primary colors and intermediate colors. Therefore, the color gamut that can be achieved is significantly increased, which increases the light efficiency of the system, increases the color gamut, and reduces cost.

First Embodiment

Figure 1A:
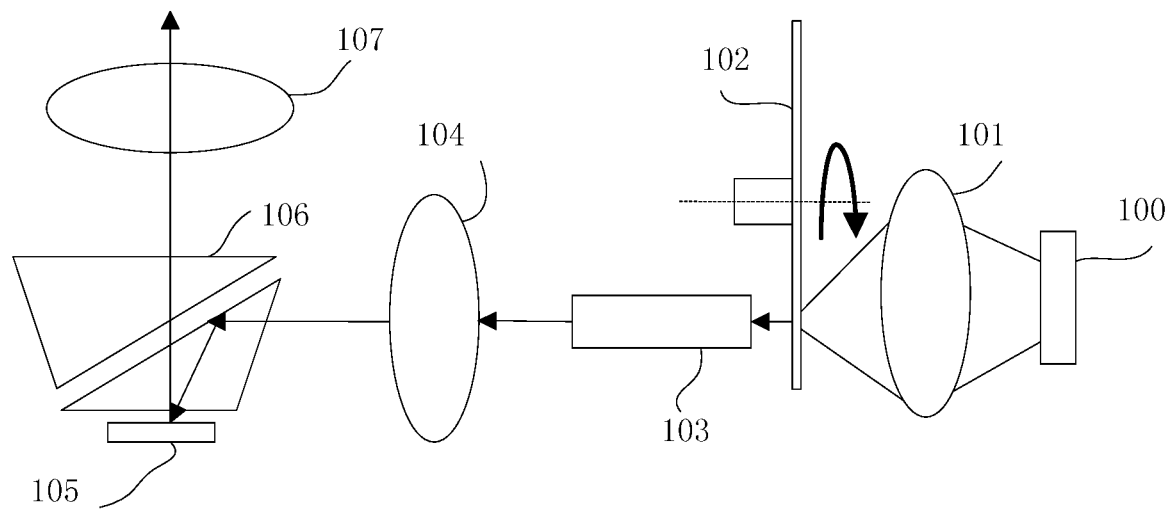
FIG. 1a schematically illustrates the structure of a conventional single chip DMD projection system.
Figure 1B:
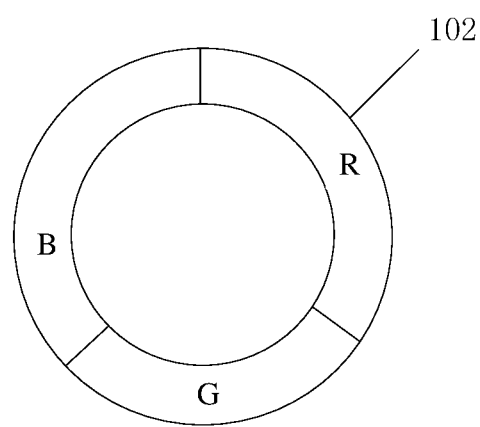
FIG. 1b shows a plan view of rotating color wheel having different color segments in the conventional technology.
Figure 2:
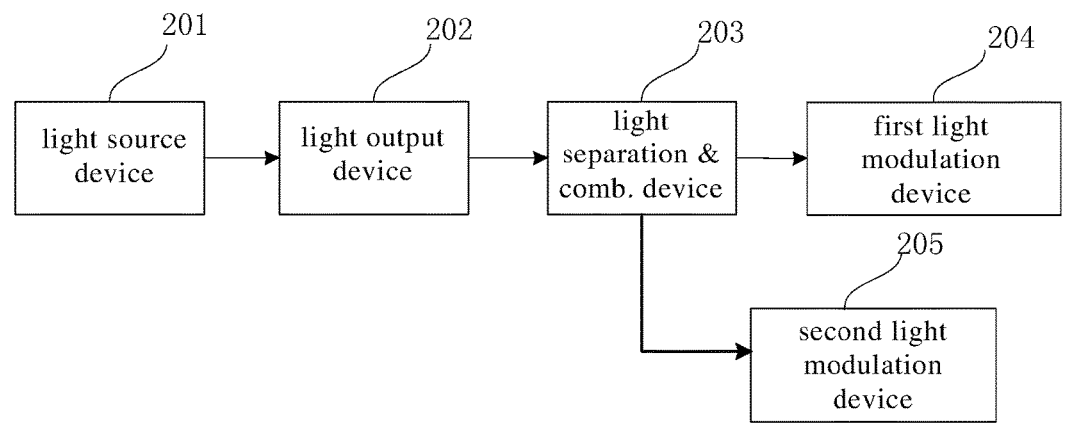
FIG. 2 schematically illustrates the structure of a light source system according to an embodiment of the present invention.

FIG. 2 schematically illustrates the structure of a light source system according to an embodiment of the present invention. As shown in FIG. 2, the light source system includes: light source device 201, light output device 202, light separation and combination device 203, first light modulation device 204 and second light modulation device 205. The light source device 201 is a laser light source that generates at least one group of excitation light. The light output device 202 receives the excitation light and converts the excitation light to generate a converted light for output. The light output device includes at least two different wavelength conversion materials, and at least one of the wavelength conversion materials generates a converted light that is a multi-color light. The light separation and combination device 203 separates the multi-color light into a first light of a first wavelength range travelling along a first light path and a second light of a second wavelength range travelling along a second light path. The first light and second light cover different wavelength ranges, and the combined light of all converted lights is a white light. A multi-color light refers to a light that contains any two of the three primary colors. The primary lights include red light, green light and blue light. In this embodiment, a monochromatic light may be a primary color light; in other embodiment, it can be a monochromatic light of other wavelength ranges or a light having a certain spectral range. The first light modulation device 204 modulates the light that travels along the first light path, and the second light modulation device 205 modulates the light that travels along the second light path. The converted light also includes a primary color light, which is guided by the light separation and combination device 203 to travel along the first light path or the second light path.

In this embodiment, the light output device 202 is a color wheel, where at least two different wavelength conversion materials are respectively located on different segments of the color wheel. The two different wavelength conversion materials are wavelength conversion materials that absorb the excitation light and generate two different multi-color lights. These wavelength conversion materials, which absorb the excitation light from light output device 202 and generate two different multi-color lights, may be cyan phosphor and yellow phosphor, or magenta phosphor and cyan phosphor, or magenta phosphor and yellow phosphor.

More specifically, the multi-segment color wheel may be a two-segment color wheel having two different wavelength conversion materials. For example, the multi-segment color wheel may be a two-segment color wheel having a yellow segment and a blue segment, or a yellow segment and a cyan segment. The multi-segment color wheel may also be a three-segment color wheel having three different wavelength conversion materials. For example, the multi-segment color wheel may be a three-segment color wheel having a cyan segment, a green segment and a yellow segment. More specifically, when the light source is a blue laser source, the wavelength conversion materials that can absorb the excitation light from the light source and generate at least two multi-color lights may be a cyan phosphor and a yellow phosphor. When the light source is a UV source, the wavelength conversion materials that can absorb the excitation light from the light source and generate at least two multi-color lights may be a cyan phosphor and a yellow phosphor, a magenta phosphor and a cyan phosphor, or a magenta phosphor and a yellow phosphor. In this embodiment, because the yellow light may be separated to generate a red light and a green light, and the cyan light may be separated to generate a yellow light and a blue light, the wavelength conversion materials on the two-segment and three-segment color wheels are not limited to the color segments described above; as long as it can ultimately generate three primary color lights, all combinations are within the scope of this invention.

Further, to achieve a wider color gamut, the light output device 202 of this embodiment further includes: a multi-segment filter wheel which rotates coaxially with the color wheel, where the multi-segment filter wheel includes at least two different colored filter segments. For example, the multi-segment filter wheel may be one that has blue, yellow and green filter regions, or blue, yellow and red filter regions, or blue, first yellow and second yellow filter regions. The filter wheel is used to filter the output light generated by the multi-segment color wheel to obtain the three primary color lights including red, green and blue colors, thereby improving light efficiency and brightness.

Further, preferably, the light source device 201 includes two groups of excitation light sources. The light output device 202 includes two color wheels respectively corresponding to the two groups of excitation light sources. Each color wheel includes at least one wavelength conversion material, and the wavelength conversion materials of the two color wheels are not identical. Preferably, one of the two color wheels includes a blue phosphor, and the other one includes a yellow phosphor; or, one of the two color wheels includes a cyan phosphor, and the other one includes a yellow phosphor; or, one of the two color wheels includes a blue phosphor, and the other one includes a yellow and a green phosphor. The light output device 202 further includes at least one multi-segment filter wheel, which rotates axially with the color wheel, the multi-segment filter wheel including at least one different color filter region. The multi-segment filter wheel preferably includes a yellow filter region and a green filter region.

Further, preferably, the two groups of excitation light sources are alternatingly turned on and off, which improves the utilization efficiency of the first and second light modulation devices, and increases the brightness of the system. Or, the turn on time intervals of one of the two groups of excitation light sources partially overlap with the turn on time intervals of the other one of the two groups of excitation light sources. Or, the two groups of excitation light sources are modulated using pulse width modulation, which increases the color switching frequency, and can effectively solve the color breakup problem of projection display systems. In this embodiment, the light source system further includes a first filter plate and/or second filter plate, where the first filter plate is disposed on the light path between the light separation and combination device and the first light modulation device, for filtering the light travelling along the first light path, and the second filter plate is disposed on the light path between the light separation and combination device and the second light modulation device, for filtering the light travelling along the second light path. This can provide three purer primary color lights, and improve the light efficiency of the system.

In the light source system of this embodiment, by using at least one group of excitation light sources, the light output device sequentially outputs different lights based on the light of the excitation light sources. The light separation and combination device separates the different lights from the light output device into lights of different wavelength ranges which respectively travel along different light paths, and the light modulation devices modulate the different lights from the light separation and combination device that travel along the different light paths. This way, the three primary color lights can be distributed in specified ways to the two DMDs for processing, so that the color gamut of the system is greatly increased, and the light efficiency and reliability of the projection system is improved.

Improved projection systems based on the first embodiment, and their operating principles, are described below with reference to FIG. 3 to FIG. 24. The second embodiment is an implementation based on modifying the wavelength conversion materials of the two-segment color wheel. The third embodiment is an implementation by changing the multi-segment color wheel from a two-segment color wheel to a three-segment color wheel. The fourth embodiment is an implementation that adds a three-segment filter wheel after a two-segment color wheel. The fifth embodiment is an implementation that adds filter plates before the light modulation devices. The sixth, seventh and eighth embodiments are implementations that add more excitation light sources and color wheel. The seventh embodiment is an implementation that adds more excitation light sources and color wheel, and further modifies the wavelength conversion materials of the color wheels. The eighth embodiment is an implementation that adds more excitation light sources and color wheel, and further modifies the turn on and turn off timing of the excitation light sources. The ninth embodiment is an implementation that changes the modulation method of the excitation light sources.

Second Embodiment

Figure 3:
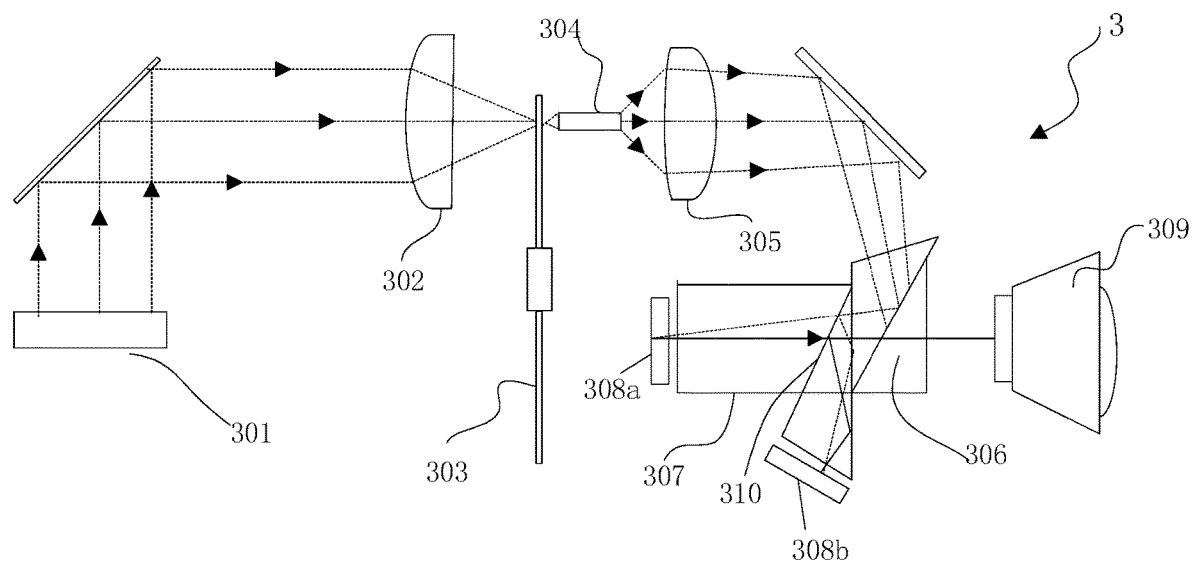
FIG. 3 schematically illustrates the structure of a projection system according to a preferred embodiment of the present invention.
Figure 4:
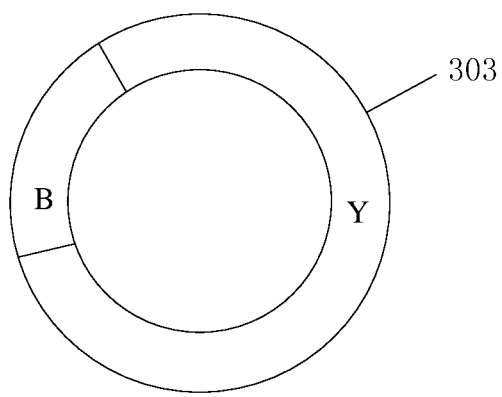
FIG. 4 shows a plan view of a light output device of the embodiment of FIG. 3.
Figure 5:
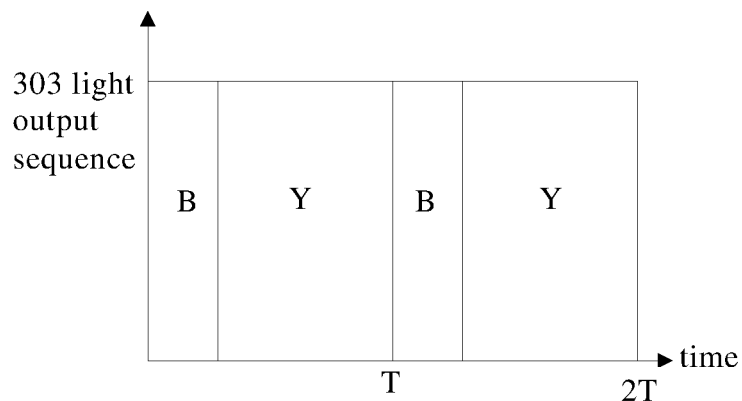
FIG. 5 is a timing diagram showing the blue and yellow light sequence outputted from the light output device.
Figure 6:
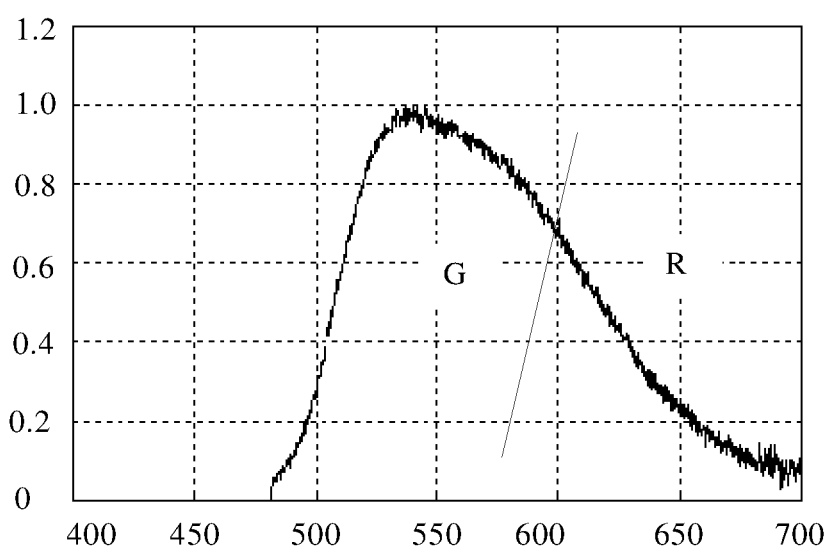
FIG. 6 illustrates the distribution of green and red lights after the light separation coating.
Figure 7A:
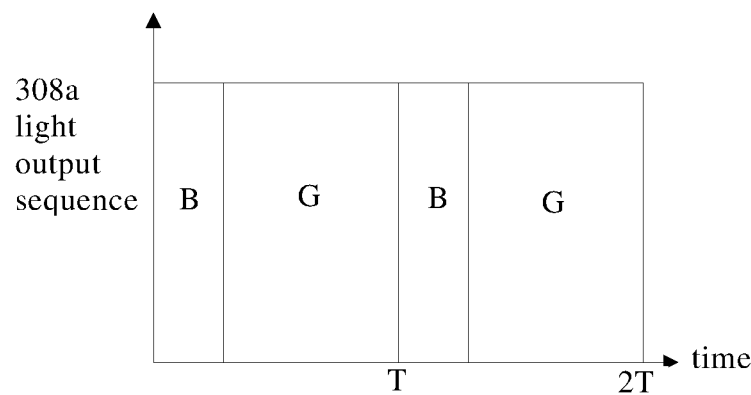
FIG. 7a is a timing diagram of the reflected light from the first DMD.
Figure 7B:
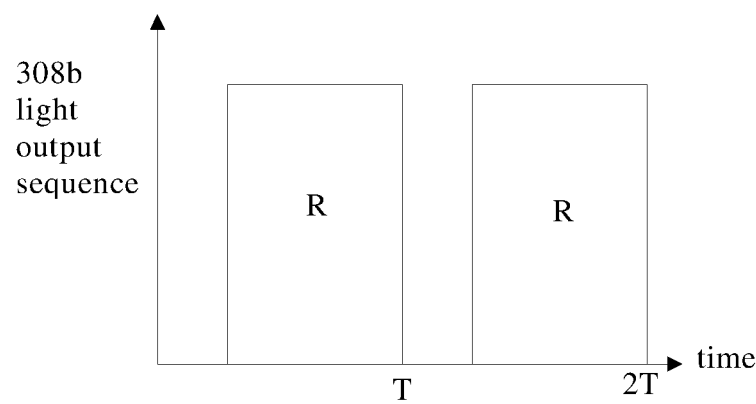
FIG. 7b is a timing diagram of the reflected light from the second DMD.

FIG. 3 schematically illustrates the structure of a projection system according to a preferred embodiment of the present invention. FIG. 4 shows a plan view of a light output device of the embodiment of FIG. 3. FIG. 5 is a timing diagram showing the blue and yellow light sequence outputted from the light output device. FIG. 6 illustrates the distribution of green and red lights after the light separation coating. FIG. 7a is a timing diagram of the reflected light from the first DMD. FIG. 7b is a timing diagram of the reflected light from the second DMD. As shown in FIGS. 3 to 7b, the projection system includes a light source system, which includes: light source device, light output device, light separation and combination device, first light modulation device and second light modulation device.

More specifically, the light source device includes: excitation light source (laser) 301, and collection lens 302. The light output device includes color wheel 303. The light separation and combination device includes: light rod 304, optical relay system 305, TIR prism 306, light separation and combination prism 307 and light separation film 310. The first light modulation device includes a first DMD 308a, and the second light modulation device includes a second DMD 308b. Preferably, the projection system further includes a projection lens 309.

More specifically, the excitation light source 301 may use a blue laser diode (LD). The blue light from the excitation light source 301 is focused by the collection lens 302 onto the color wheel 303 which is coated with phosphor materials. The color wheel 303 is a two-segment color wheel having a blue segment and a yellow segment, where the blue segment transmits the excitation light, and the yellow segment contains a yellow phosphor. Of course, the color wheel 303 may be a two-segment color wheel of other colors, such as a blue and cyan two-segment color wheel. The color wheel 303 outputs a blue light and a yellow light in a time sequence, as shown in FIG. 5. The blue light and yellow light are homogenized by the light rod 304, is collimated by the optical relay system 305, and is then inputted to the TIR prism 306 and the light separation and combination prism 307. A light separation film 310 is coated between the two prisms of the light separation and combination prism 307. The light separation film 310 separates the yellow light in the input light into a red light and a green light. At the location of the light separation film 310, one of the two lights is reflected and the other one is transmitted. Thus, the light inputted to the first DMD 308a and the second DMD 308b are respectively green light, blue light and red light, or red light, blue light and green light. In other words, when the red light is reflected and the green light is transmitted, the light inputted to the first DMD 308a is green light and blue light, as shown in FIG. 7a, and the light inputted to the second DMD 308b is red light, as shown in FIG. 7b. Or, when the green light is reflected and the red light is transmitted, the light inputted to the first DMD 308a is red light and blue light, and the light inputted to the second DMD 308b is green light. The input lights are modulated by the first DMD 308a and the second DMD 308b, and are reflected and combined, and the combined light forms an image by the lens 309.

Third Embodiment

Figure 8:
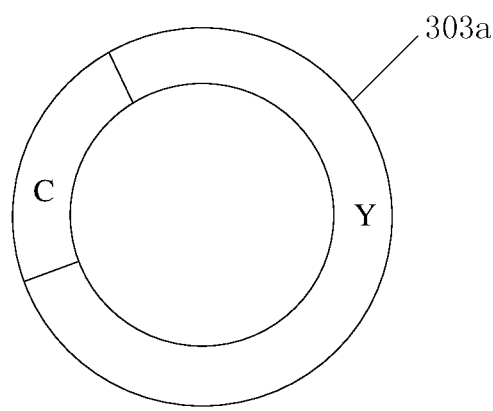
FIG. 8 shows a plan view of an improved light output device based on the projection system of the embodiment of FIG. 3.
Figure 9:
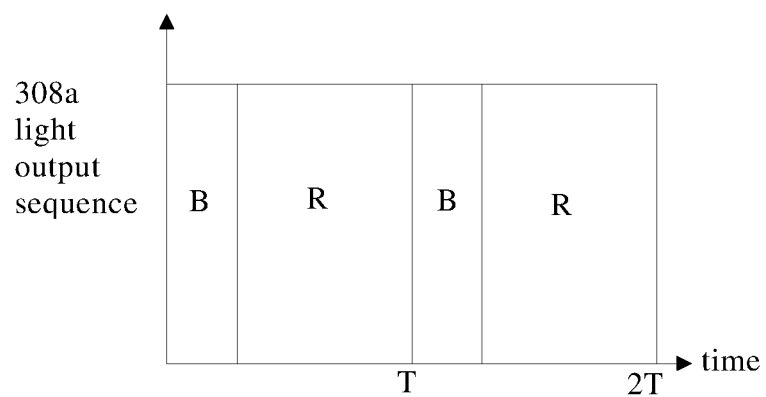
FIG. 9 is a timing diagram of the reflected light from the first DMD.
Figure 10:
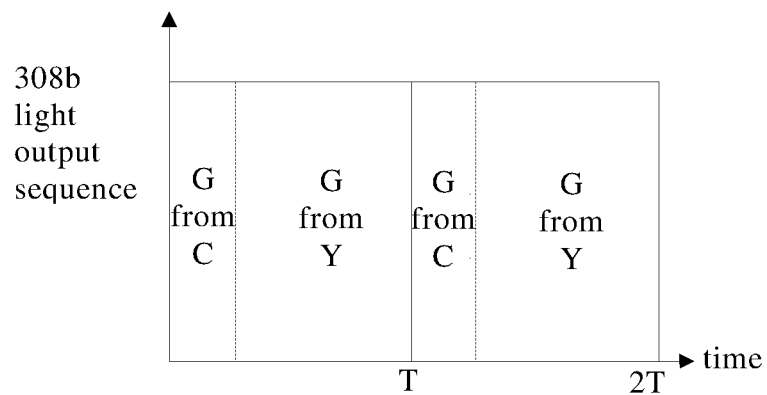
FIG. 10 is a timing diagram of the reflected light from the second DMD.

FIG. 8 shows a plan view of an improved light output device of the projection system of the embodiment of FIG. 3. FIG. 9 is a timing diagram of the reflected light from the first DMD. FIG. 10 is a timing diagram of the reflected light from the second DMD. As shown in FIGS. 8, 9 and 10, compared to the second embodiment, this embodiment changes the color wheel of the second embodiment to a two-segment color wheel 303a which has a cyan segment and a yellow segment, with other components remaining unchanged. The color wheel 303a outputs a sequence of cyan light and yellow light, which is homogenized by the light rod 304, collimated by the optical relay system 305, and then inputted to the TR prism 306 and the light separation and combination prism 307. A light separation film 310 is coated between the two prisms of the light separation and combination prism 307. The light separation film 310 separates the yellow light in the input light into a red light and a green light, and separates the cyan light in the input light into a blue light and a green light. The blue light and the red light are inputted to one DMD (e.g. the first DMD 308a) for processing, as shown in FIG. 9. The green light is inputted to the other DMD (e.g. the second DMD 308b) for processing, as shown in FIG. 10. The input lights are modulated by the first DMD 308a and the second DMD 308b, and are reflected and combined, and the combined light forms an image by the lens 309.

Compared to the second embodiment, in this embodiment, by using two DMDs, the cyan light is separated according to the time sequence to generate a green light, and the yellow light is separated according to the time sequence to generate a green light; this improves light utilization efficiency. Also, because the green component is enhanced, the brightness of the projection system is increased.

Fourth Embodiment

Figure 11:
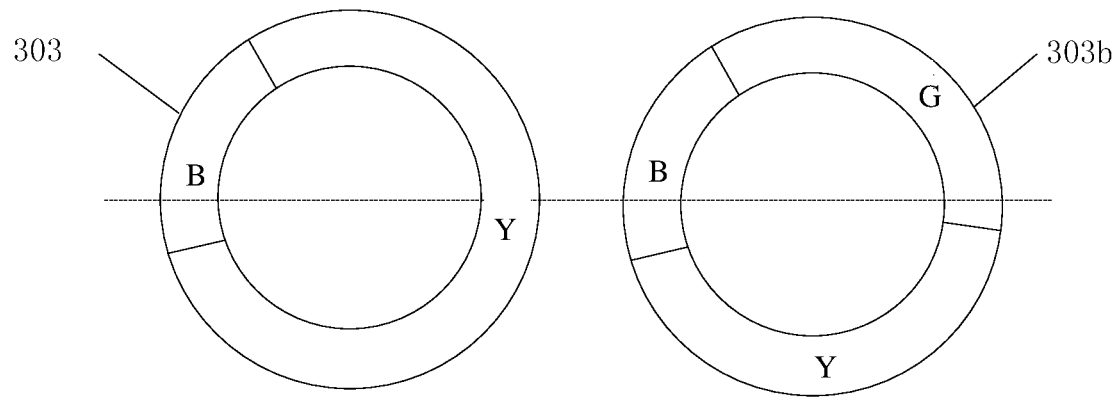
FIG. 11 shows a plan view of another improved light output device based o the projection system of the embodiment of FIG. 3.
Figure 12A:
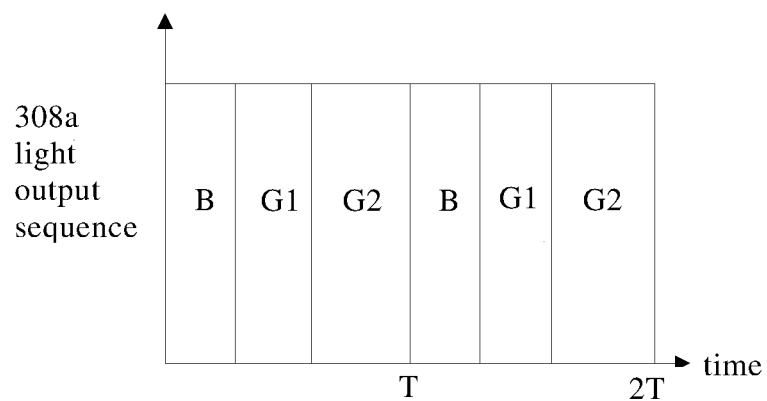
FIG. 12a is a timing diagram of the reflected light from the first DMD.
Figure 12B:
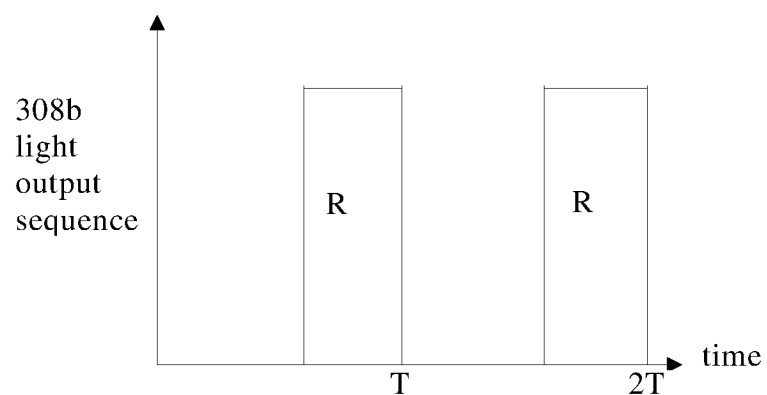
FIG. 12b is a timing diagram of the reflected light from the second DMD.
Figure 13A:
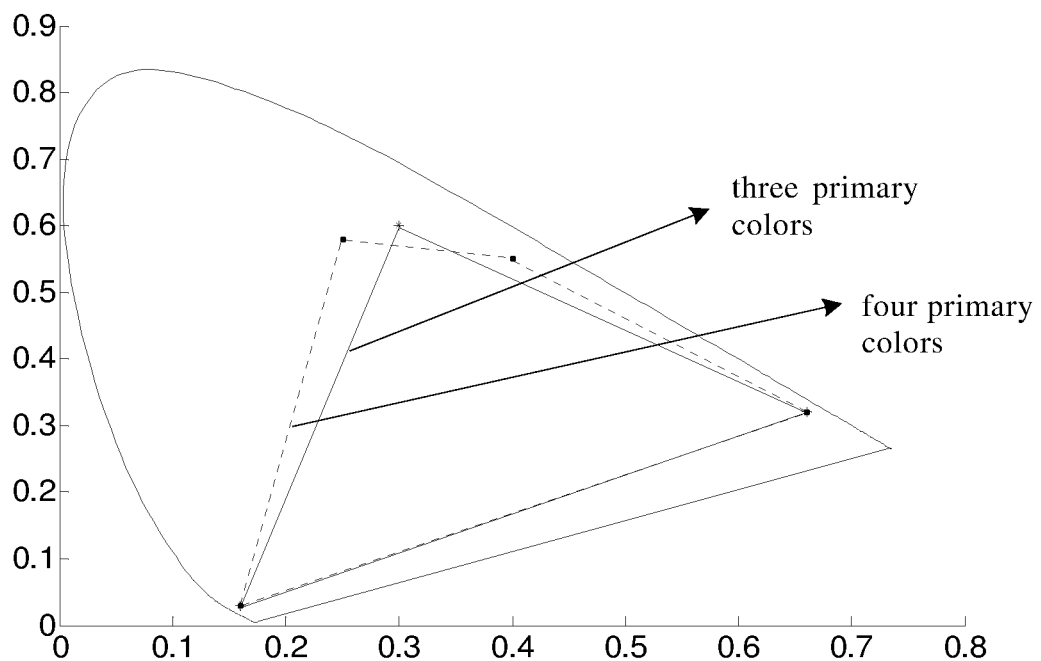
FIG. 13a illustrates a color gamut.

FIG. 11 shows a plan view of another improved light output device of the projection system of the embodiment of FIG. 3. As shown in FIG. 11, compared to the second embodiment, this embodiment adds a three-segment filter wheel 303b that includes a blue, a green and a yellow segment, located downstream of the two-segment color wheel 303 that includes a blue and a yellow segment. The two-segment color wheel 303 and the three-segment filter wheel 303b are mounted on the same rotation axis, and a common drive device is used to drive the two wheels to rotate synchronously. A part of the yellow light generated by the color wheel 303 is filtered by the green filter plate of the three-segment filter wheel 303b into a green light, and another part of the yellow light is filtered by the yellow filter plate of the three-segment filter wheel 303b and remains a yellow light. FIG. 12a is a timing diagram of the reflected light from the first DMD. FIG. 12b is a timing diagram of the reflected light from the second DMD. As shown in FIGS. 12a and 12b, in the light sequences from the two DMDs, two kinds of green light are obtained, so the three primary color lights now become four primary color lights of blue, green 1, green 2 and red. FIG. 13a illustrates a color gamut. As shown in FIG. 13a, the color gamut is increased.

Figure 13B:
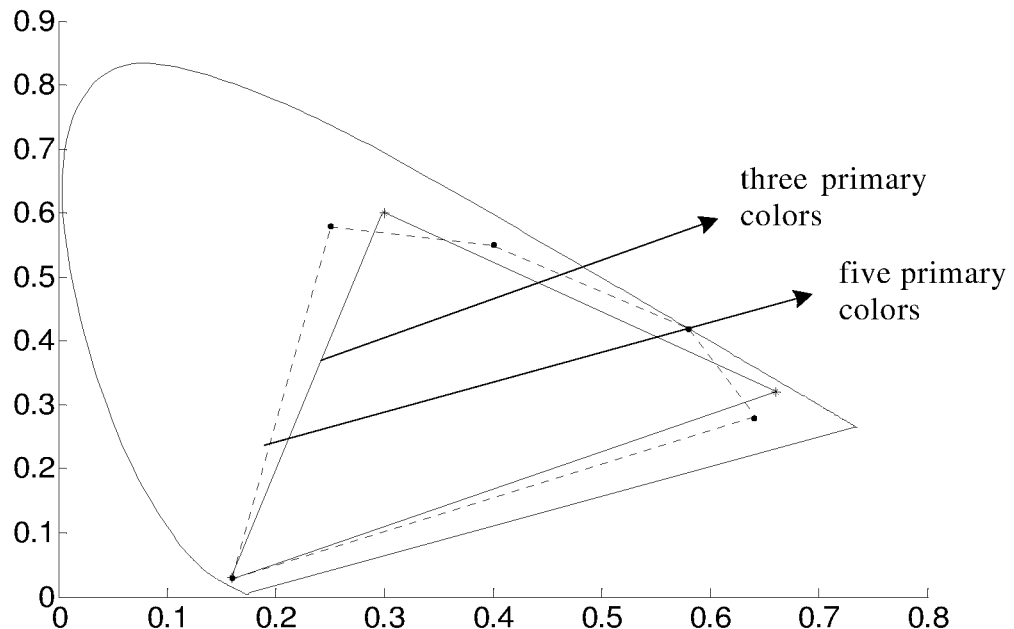
FIG. 13b illustrates another color gamut.

Preferably, the green filter plate of the three-segment filter wheel may be changed to a red filter plate. Thus, red 1 and red 2 lights are obtained from the second DMD, thereby obtaining four primary color lights of blue, green, red 1 and red 2. Or, without adding the three-segment filter wheel 303b, the two-segment color wheel 303 with blue and yellow segments may be changed to a two-segment color wheel with cyan and yellow segments, which can produce four primary color lights of blue, green 1, green 2 and red. Or, the two-segment color wheel 303 may be changed to a three-segment color wheel with blue, green and yellow segments, which can also produce four primary color lights of blue, green 1, green 2 and red. Or, still using the two-segment color wheel 303 with blue and yellow segments, the three-segment filter wheel 303b is changed to a three-segment filter wheel having blue, yellow 1 and yellow 2 segments, to obtain two different yellow lights. Yellow 1 and yellow 2 lights are separated at the light separation and combination prism 307 into green 1, red 1, green 2 and red 2 lights, thereby obtaining five primary lights of blue, green 2, green 2, red 1 and red 2. FIG. 13b illustrates another color gamut. As shown in FIG. 13b, the color gamut obtained this way is broader. Or, without using the three-segment filter wheel 303b, the two-segment color wheel 303 may be changed to a three-segment color wheel that includes cyan, green and yellow segments, to obtain five primary color lights if blue, green 1, green 2, green 3 and red. Or, the two-segment color wheel 303 may be changed to a three-segment color wheel that includes blue, yellow 1 and yellow 2 segments, which can also provide five primary colors of blue, green 1, green 2, red 1 and red 2.

It should be noted that the implementations of this embodiment are not limited to the above, and further modifications may be made. For example, by adding excitation light sources, changing the colors of various segments of the multi-segment color wheels, adding more DMDs, etc., multiple color output including primary colors and intermediate colors can be generated. More specifically, by increasing the color gamut that can be obtained from the excitation lights, a color gamut having more primary colors can be obtained, in order to satisfy requirements of various image standards and to enhance the color gamut of the system.

Fifth Embodiment

Figure 14:
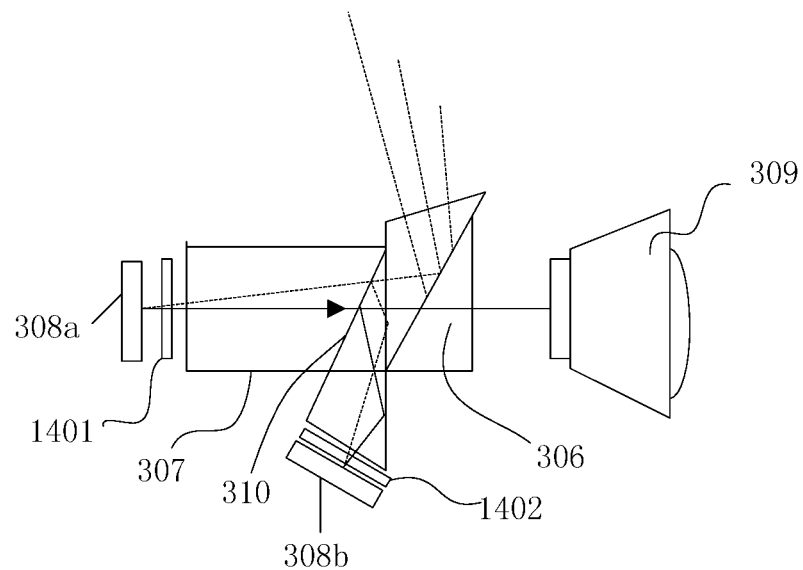
FIG. 14 schematically illustrates the structure of a projection system according to a preferred embodiment of the present invention.
Figure 15:
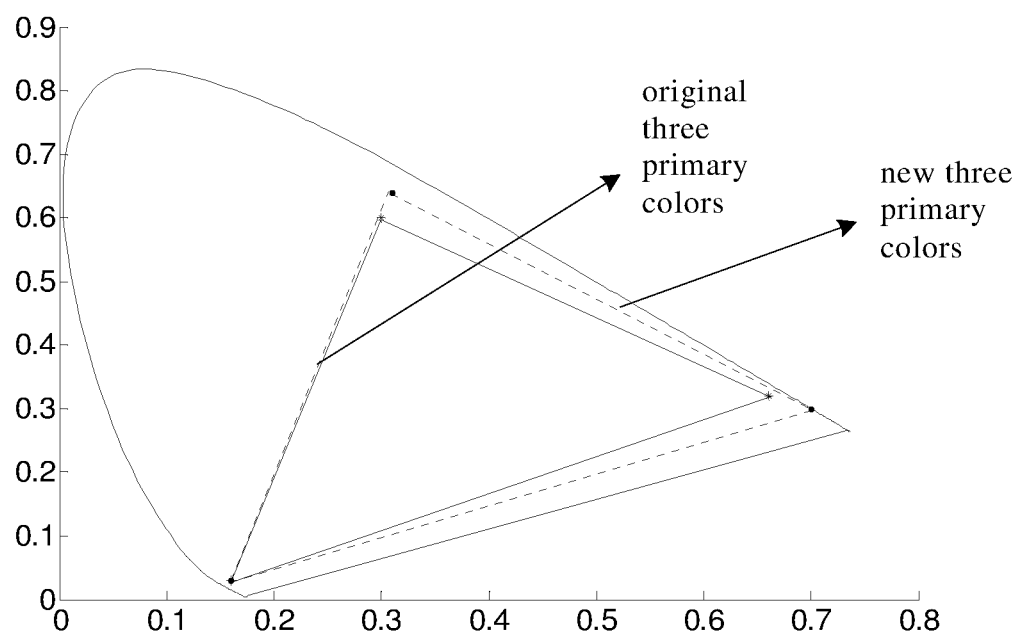
FIG. 15 illustrates a color gamut.

FIG. 14 schematically illustrates the structure of a projection system according to a preferred embodiment of the present invention. As shown in FIG. 14, a first filter plate 1401 and a second filter plate 1402 are respectively provided in front of the two DMDs, and are respectively a green filter plate and a red filter plate. FIG. 15 illustrates a color gamut. As shown in FIG. 15, after filtering of the green light and the red light by the first filter plate 1401 and the second filter plate 1402 respectively, the red light and green light inputted to the two DMDs are purer, thereby providing three primary colors with broader color gamut.

Sixth Embodiment

Figure 16:
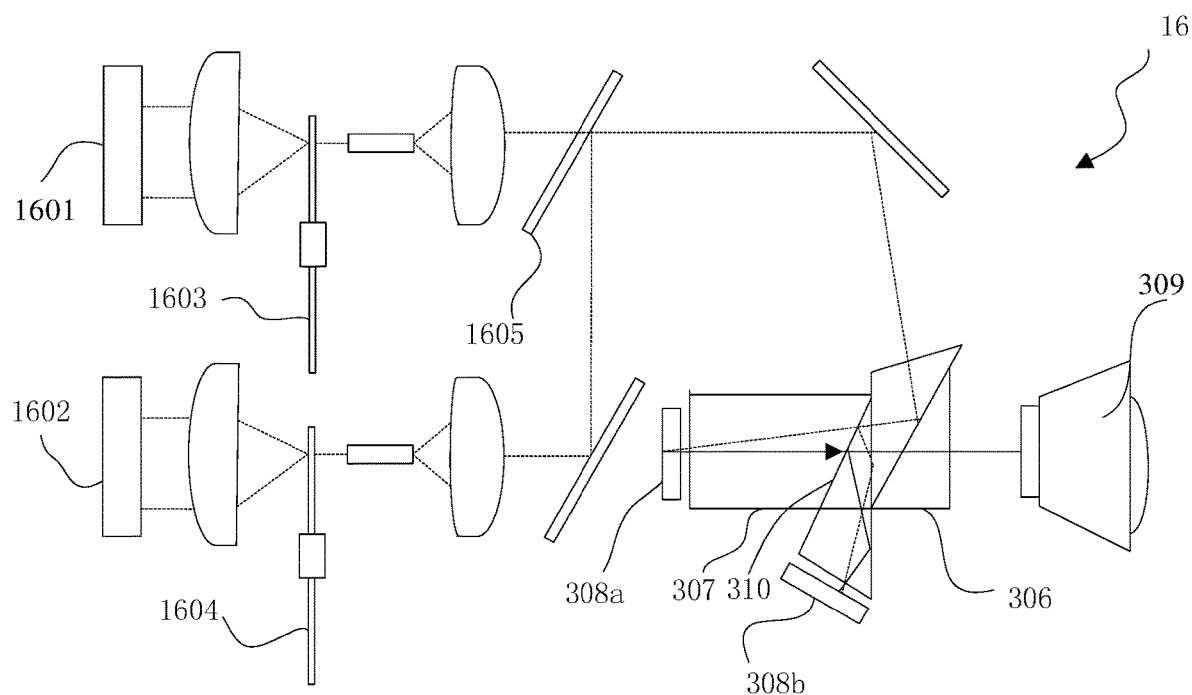
FIG. 16 schematically illustrates the structure of a projection system according to a preferred embodiment of the present invention.
Figure 17:
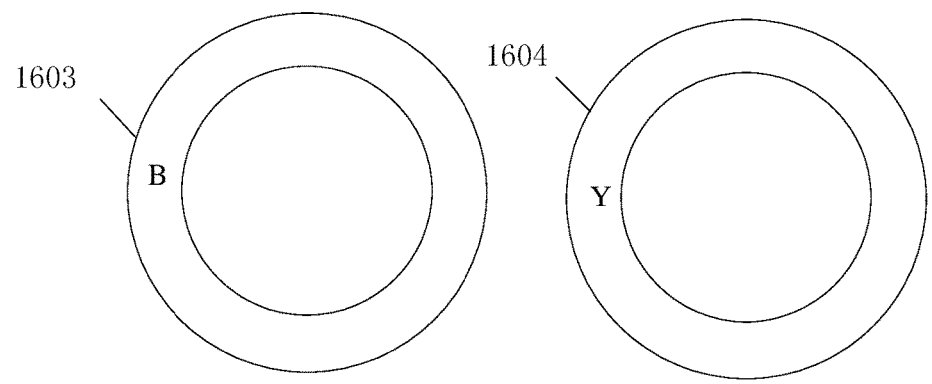
FIG. 17 shows a plan view of a light output device.
Figure 18:
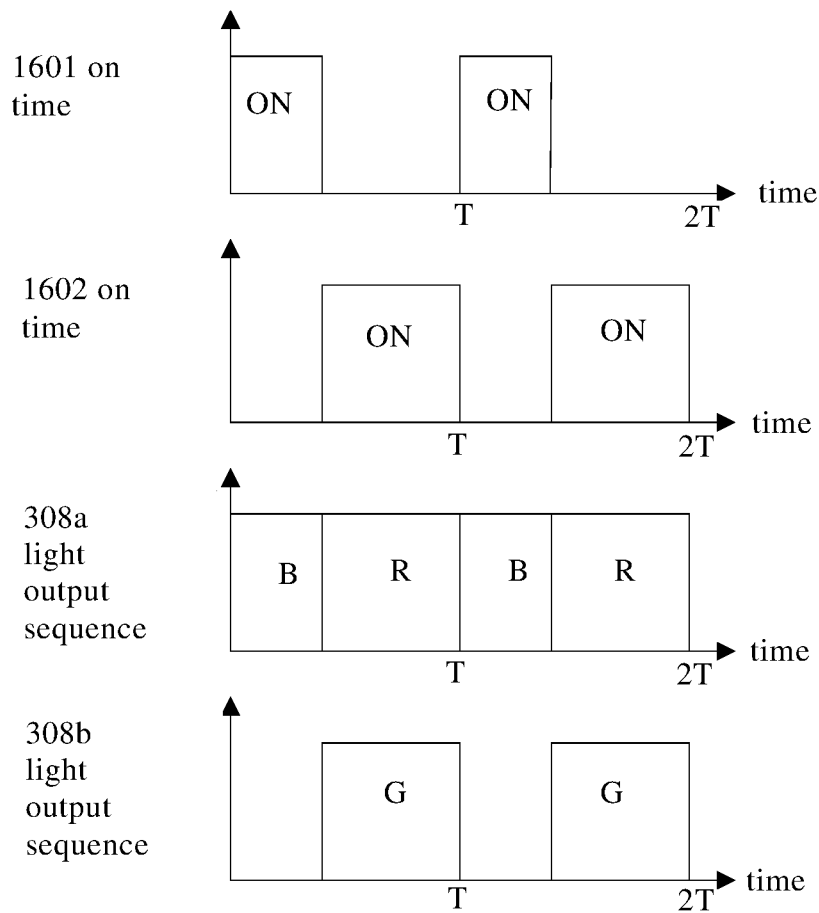

FIG. 16 schematically illustrates the structure of a projection system according to a preferred embodiment of the present invention. FIG. 17 shows a plan view of a light output device. This embodiment is based on the second embodiment, and changes the color wheel 303 to two color wheels including the first color wheel 1603 and the second color wheel 1604. As shown in FIGS. 16 and 17, the excitation light sources include an excitation light source 1601 and an excitation light source 1602. In practice, the excitation light sources may be, for example, blue LD modules. FIG. 18 is a timing diagram of the reflected light from the first and second DMDs when the light source devices are alternatingly turned on. As shown in FIG. 18, the turn on time periods of the excitation light source 1601 and the excitation light source 1602 correspond to the light sequence of the light output from the first DMD 308a and the second DMD 308b. The first excitation light source 1601 and the second excitation light source 1602 are alternatingly turned on; the blue light and red light are input to the first DMD 308a, and the green light is input to the second DMD 308b. The light output from the first excitation light source 1601 and the second excitation light source 1602 are focused by the collection lenses 302 onto the color wheel 1603 and the color wheel 1604, respectively, as shown in FIG. 17. The color wheel 1603 and the color wheel 1604 are respectively a single-segment blue light scattering wheel and a single-segment yellow phosphor wheel. The light output from the color wheels are respectively homogenized by the light rods 304 and collimated by the optical relay systems 305, and inputted to a filter plate 1605 which transmits blue light and reflects yellow light, so that the blue light and the yellow light are combined by the filter plate 1605. The combined light is input to the TIR prism 1606, and then directed by the light separation and combination prism 1607 to the first DMD 308a and the second DMD 308b. The lights reflected by the DMDs are ultimately imaged via the projection lens 309 to form the image. Of course, this invention is not limited to the above; for example, the red light and the green light may be swapped.

Seventh Embodiment

Figure 19:
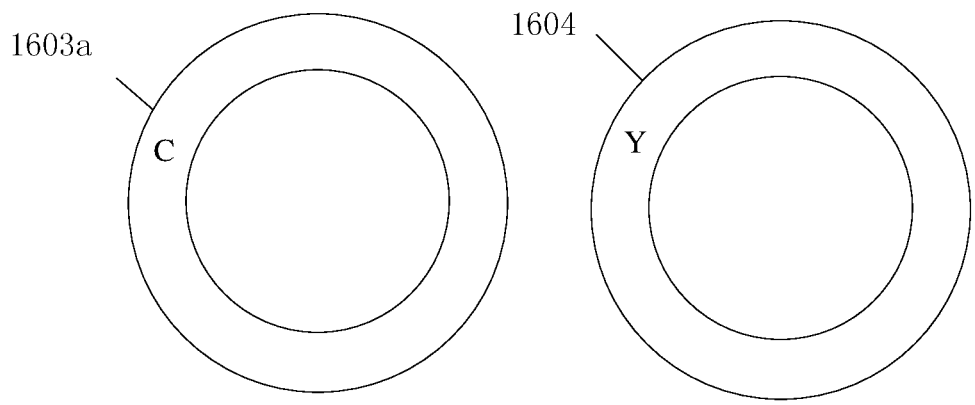
FIG. 19 shows a plan view of an improved light output device based on the projection system of the embodiment of FIG. 16.
Figure 20:
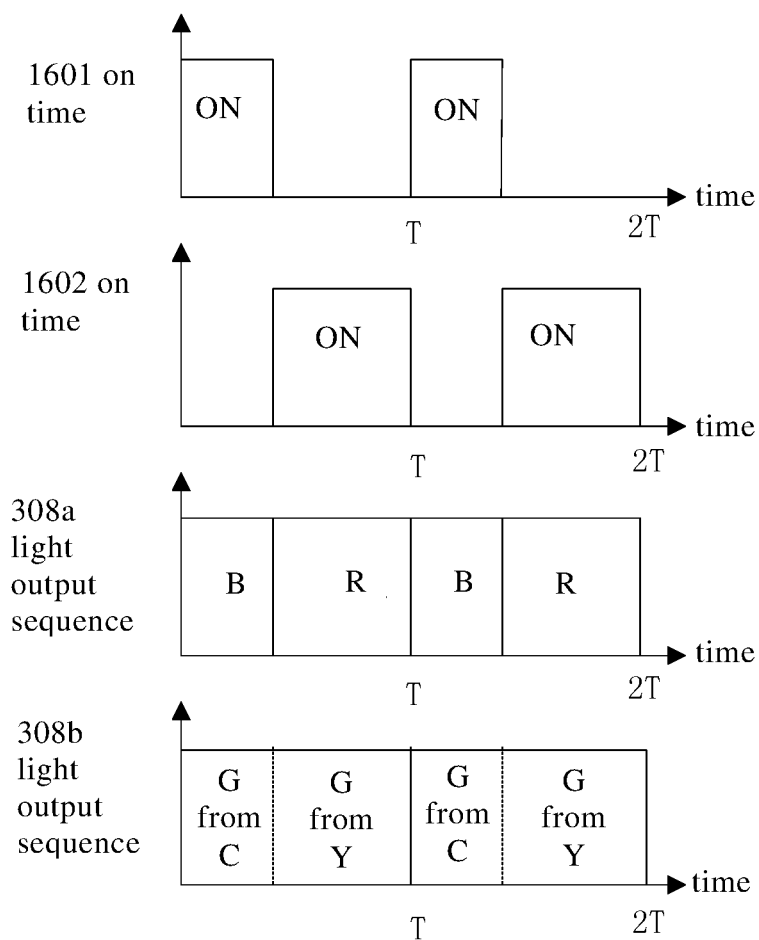

FIG. 19 shows a plan view of an improved light output device of the projection system of the embodiment of FIG. 16. As shown in FIG. 19, this embodiment is based on the fifth embodiment, and changes the color wheel 1603 to a cyan phosphor color wheel 1603a. The other components remain unchanged. FIG. 20 is a timing diagram of the reflected light from the first DMD 308a and the second DMD 308b when the light source devices are alternatingly turned on. As shown in FIG. 20, the turning on times of the first excitation light source 1601 and the second excitation light source 1602 correspond respectively to the light sequences of the light from the first DMD 308a and the second DMD 308b. This method improves the utilization efficiency of the first DMD 308a and the second DMD 308b and increases the brightness of the system.

Eighth Embodiment

Figure 21:
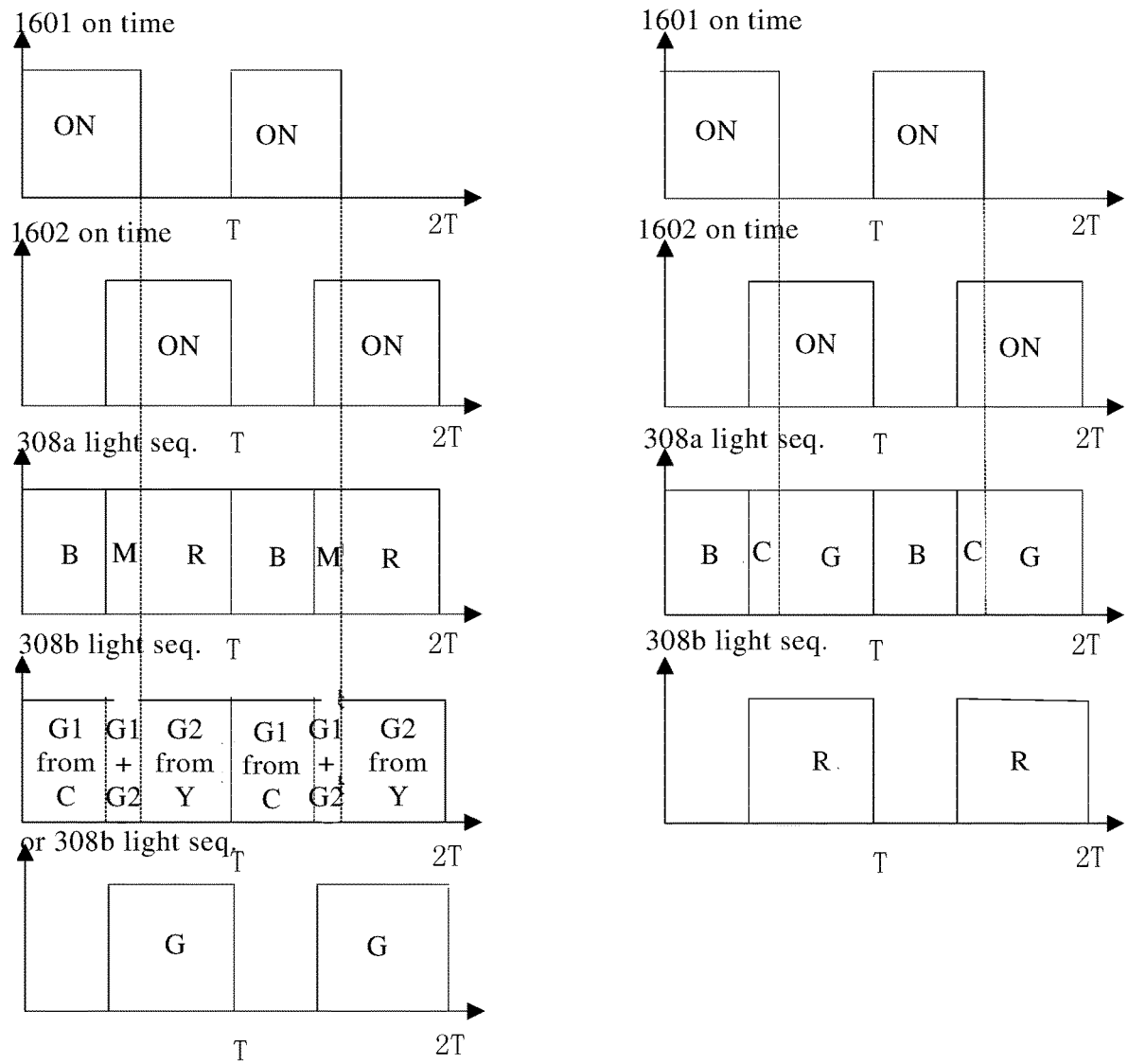
FIG. 21 is a timing diagram of the reflected light from the first and second DMDs when the turn on time of the light source devices are increased.

Based on the sixth and seventh embodiments, the eighth embodiment increases the turning on time duration of the first excitation light source 1601, so that the first excitation light source 1601 and the second excitation light source 1602 are both turned on during certain time periods, i.e. they overlap. As a result, during the overlapping time periods, a multi-color light is obtained from the two DMDs which process the different multi-color lights; for example, blue and red lights can be combined into a magenta light, and blue and green lights can be combined into a cyan light. FIG. 21 is a timing diagram of the reflected light from the first DMD and the second DMD when the turning on time of the light source devices are increased. As shown in FIG. 21, depending on whether the color wheel 1603 is a single-segment blue color wheel or a single-segment cyan color wheel, the time sequence of the output light from the second DMD 308b has two situations. During the time period when both excitation light sources are turned on, the combined light formed by the lights from the two DMDs is a combined light of magenta and green, or a combined light of cyan and red, both of which result in a white combined light. This greatly increased the brightness of the system.

Ninth Embodiment

Figure 22:
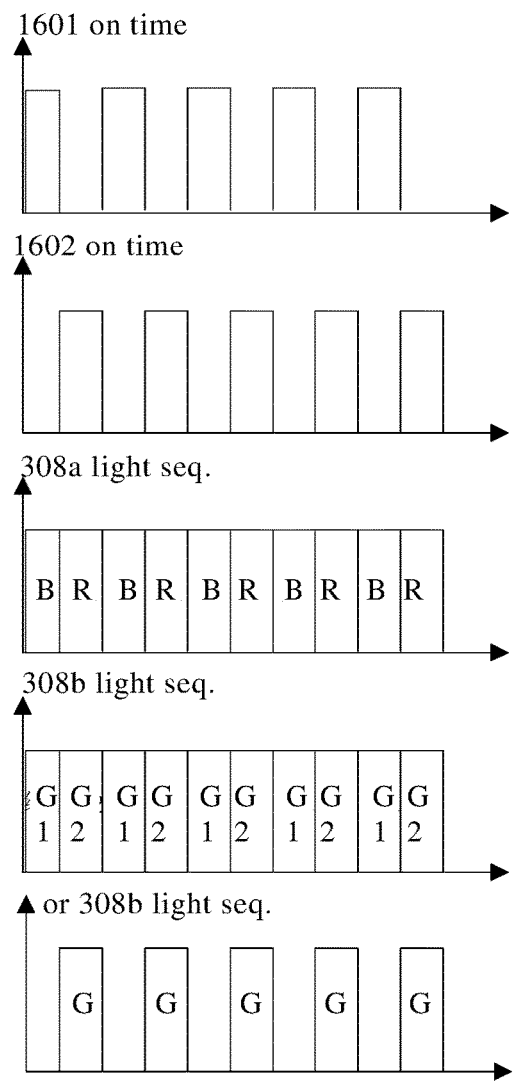
FIG. 22 is a timing diagram of the reflected light from the first and second DMDs when the light source devices are modulated using pulse width modulated.
Figure 22:
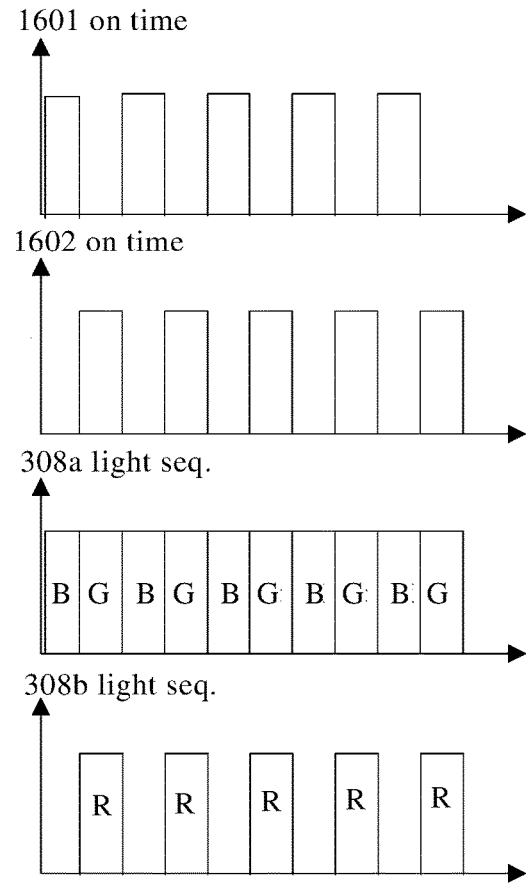

Based on the sixth and seventh embodiments, the ninth embodiment treats the lights output by the pair of color wheels, i.e. blue light and yellow light respectively outputted by the single-segment blue color wheel and the single-segment yellow color wheel, or cyan light and yellow light respectively outputted by the single-segment cyan color wheel and the single-segment yellow color wheel, as two light sources, and applies pulse width modulation (PWM) to their excitation light sources. FIG. 22 is a timing diagram of the reflected light from the first and second DMDs when the light source devices are modulated using pulse width modulated. As shown in FIG. 22, the pulse sequences of the first excitation light source 1601 and the second excitation light source 1602 correspond respectively to the light sequences of the light from the first DMD 308a and the second DMD 308b. Using PWM can increase the switching frequency between the different colors, and can effectively solve the color breakup problem of projection display systems.

Tenth Embodiment

Figure 23:
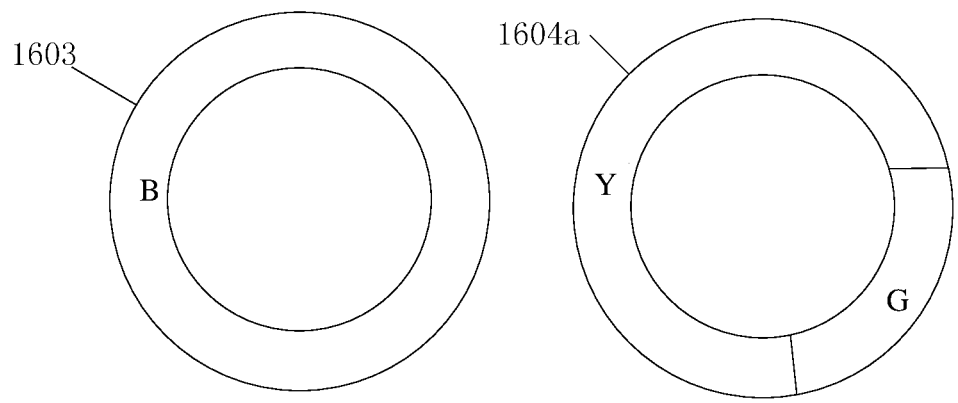
FIG. 23 shows a plan view of an improved light output device based on the projection system of the embodiment of FIG. 16.
Figure 24:
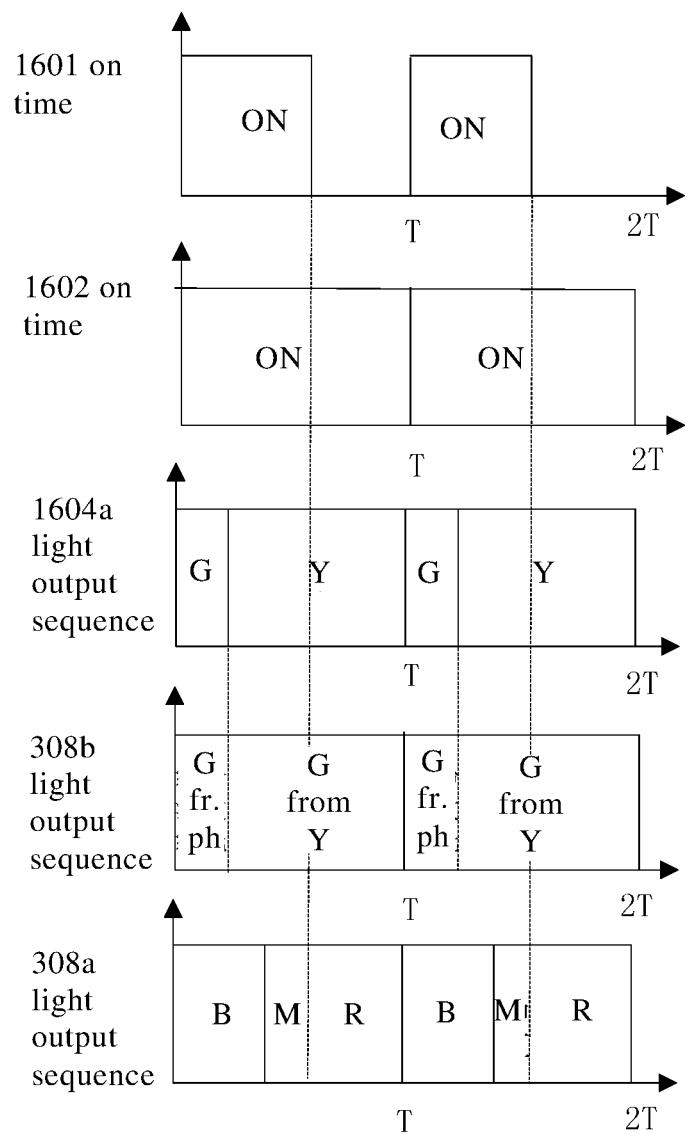
FIG. 24 is a timing diagram of the reflected light from the first and second DMDs.

Based on the sixth embodiment, the tenth embodiment changes at least one of the two single-segment color wheels to a multi-segment color wheel. FIG. 23 shows a plan view of an improved light output device of the projection system of the embodiment of FIG. 16. As shown in FIG. 23, this embodiment uses a two-segment color wheel 1604a that has a yellow segment and a green segment, and a single-segment blue color wheel 1603. FIG. 24 is a timing diagram of the reflected light from the first DMD 308a and second DMD 308b. FIG. 24 shows the turn on sequences of the two excitation light sources and the corresponding light sequences of the two DMD. This embodiment is not limited to this particular design of color wheels; any color wheel design is within the scope of this embodiment so long as: it provides three primary colors, i.e. of the two DMDs, one DMD processes one primary color and the other DMD sequentially processes the other two primary colors, and it allows combination of colors during some time periods, such as combining blue and red lights into magenta light, or combining blue and green lights into cyan light.

Further, this embodiment is not limited to using multi-segment color wheels; it can also use a single-segment color wheel, or a two-segment or a multi-segment color wheel, and add a filter wheel that rotates synchronously with the color wheel. This can also meet the above conditions of providing three primary color lights to two DMDs. In this embodiment, either or both of the single-segment color wheels can be changed to multi-segments color wheels, so the embodiment may use a combination of a two-segment color wheel and a single-segment color wheel, or a combination of two two-segment color wheels, etc. All of such combinations are within the scope of this embodiment. This embodiment can ensure brightness and at the same time ensure a broad color gamut.

Eleventh Embodiment

Figure 25:
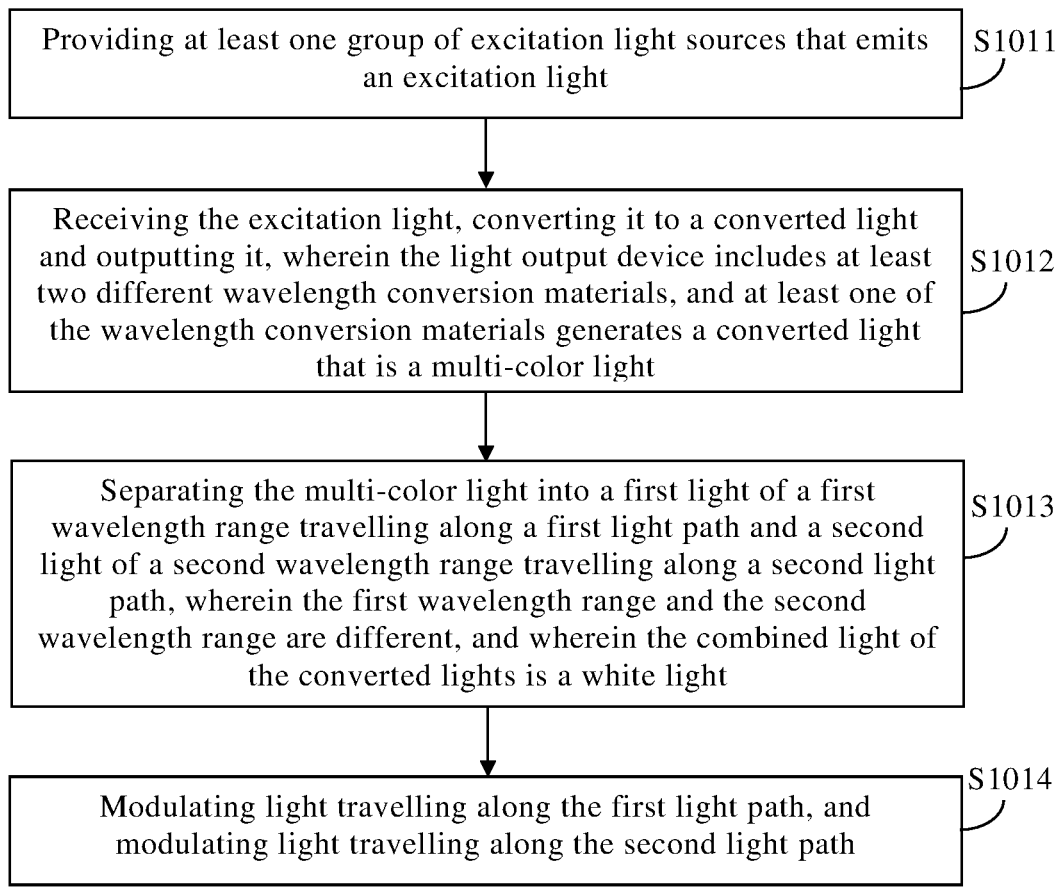
FIG. 25 is a flow chart showing a projection method according to a preferred embodiment of the present invention.

FIG. 25 is a flow chart showing a projection method according to a preferred embodiment of the present invention. As shown in FIG. 25, the method includes:

Step S1011: Providing at least one group of excitation light sources (laser sources) that emits an excitation light.

Step S1012: Receiving the excitation light, converting it to a converted light and outputting it, wherein the converted light includes at least one multi-color light.

Step S1013: Separating the multi-color light into a first light of a first wavelength range travelling along a first light path and a second light of a second wavelength range travelling along a second light path, wherein the first wavelength range and the second wavelength range are different, and wherein the combined light of the converted light is a white light.

Step S1014: Modulating the light travelling along the first light path, and modulating the light travelling along the second light path.

In the projection method according to this embodiment, by providing at least one group of excitation light sources, the light output device sequentially outputs different lights based on the excitation light emitted by the excitation light sources. The light separation and combination device separates the different lights from the light output device into lights of different wavelength ranges travelling along different light paths. The light modulation devices modulate the different lights from the light separation and combination device that travel along different light paths. This way, the three primary color lights are distributed to two DMD for processing, which increases the color gamut of the light source system and improves the light efficiency and reliability of the system.

It will be apparent to those skilled in the art that various modification and variations can be made in the light source system and related method of the present invention without departing from the spirit or scope of the invention. Thus, it is intended that the present invention cover modifications and variations that come within the scope of the appended claims and their equivalents.

What is claimed is:

1. A light source system, comprising:
a light source device, including least one group of excitation light sources generating an excitation light;
a light output device, which receives the excitation light and converts the excitation light to generate a converted light for output, the converted light being a multi-color light containing three primary color components, wherein the light output device includes a color wheel which carries exactly two different wavelength conversion materials located on different segments of the color wheel occupying an entire peripheral area of the color wheel, wherein the peripheral area of the color wheel includes no part that does not carry either of the two wavelength conversion materials, each wavelength conversion material generating a part of the converted light, wherein the two different wavelength conversion materials are a cyan phosphor and a yellow phosphor, or a magenta phosphor and a cyan phosphor, or a magenta phosphor and a yellow phosphor;
a light separation and combination device, which separates the multi-color light into a first light of a first wavelength range which is a first one of the three primary color components travelling along a first light path and a second light of a second wavelength range which is a second one of the three primary color components travelling along a second light path, wherein the first wavelength range and the second wavelength range are different, and wherein the light separation and combination device directs each primary color component of the converted light to either the first light path or the second light path;
a first light modulation device, which modulates light that travels along the first light path; and
a second light modulation device, which modulates light that travels along the second light path,
wherein the first and second light modulation device collectively modulate all three primary color components of the converted light.

2. The light source system of claim 1, wherein the light output device further comprises a multi-segment filter wheel which rotates coaxially with the color wheel, wherein the multi-segment filter wheel includes at least two different colored filter segments.

3. A projection system, comprising:
the light source system of claim 1, and
a projection lens,
wherein the projection lens receives from the light source system the combined light after modulation, to form a projected image.

4. A projection method, comprising:
providing at least one group of excitation light sources that emits an excitation light;
receiving the excitation light, and using a color wheel which carries exactly two different wavelength conversion materials, converting the excitation light to a converted light and outputting it, the converted light being a multi-color light containing three primary color components, wherein the two different wavelength conversion materials are a cyan phosphor and a yellow phosphor, or a magenta phosphor and a cyan phosphor, or a magenta phosphor and a yellow phosphor, and wherein the two different wavelength conversion materials occupy an entire peripheral area of the color wheel and the peripheral area of the color wheel includes no part that does not carry either of the two wavelength conversion materials;
directing each primary color component of the converted light to either a first light path or a second light path, including separating the multi-color light into a first light of a first wavelength range which is a first one of the three primary color components travelling along the first light path and a second light of a second wavelength range which is a second one of the three primary color components travelling along the second light path, wherein the first wavelength range and the second wavelength range are different; and
modulating light travelling along the first light path using a first light modulation device, and modulating light travelling along the second light path using a second light modulation device, wherein the first and second light modulation device collectively modulate all three primary color components of the converted light.

* * * * *